US012768456B2

(12) United States Patent
Chang

(10) Patent No.: US 12,768,456 B2
(45) Date of Patent: Oct. 20, 2026

(54) WATER CONTROL VALVE

(71) Applicant: HAIN YO ENTERPRISES CO., LTD., Changhua (TW)

(72) Inventor: Chia-Po Chang, Changhua (TW)

( * ) Notice: Subject to any disclaimer, the term of this patent is extended or adjusted under 35 U.S.C. 154(b) by 19 days.

(21) Appl. No.: 19/091,816

(22) Filed: Mar. 27, 2025

(65) Prior Publication Data

US 2026/0298357 A1 Oct. 1, 2026

(51) Int. Cl.

*F16K 11/074* (2006.01)
*F16K 11/078* (2006.01)
*F16K 31/60* (2006.01)

(52) U.S. Cl.

CPC ........ *F16K 11/074* (2013.01); *F16K 11/0782* (2013.01); *F16K 31/605* (2013.01); *Y10T 137/86823* (2015.04)

(58) Field of Classification Search

CPC .... F16K 11/074; F16K 11/07; F16K 11/0743; F16K 11/0787; F16K 3/02; F16K 3/0209; F16K 31/524; F16K 39/02; F16K 11/0782; F16K 11/0785; F16K 11/0746; F16K 11/072; F16K 31/605; G05D 23/13–1373; Y10T 137/86823

See application file for complete search history.

(56) References Cited

U.S. PATENT DOCUMENTS

| | | | | | |
|---|---|---|---|---|---|
| 5,402,827 | A * | 4/1995 | Gonzalez | F16K 11/0787 | 137/271 |
| 6,009,893 | A * | 1/2000 | Chang | G05D 23/1313 | 137/98 |
| 6,640,357 | B1 * | 11/2003 | Chang | F16K 11/0746 | 4/677 |
| 6,981,693 | B1 * | 1/2006 | Chang | F16K 31/605 | 251/368 |
| 7,174,916 | B2 * | 2/2007 | Chang | F16K 11/0743 | 137/637.3 |
| 7,806,134 | B1 * | 10/2010 | Chang | G05D 23/1313 | 137/98 |
| 7,918,241 | B1 * | 4/2011 | Chang | G05D 23/1313 | 137/607 |
| 11,346,459 | B1 * | 5/2022 | Peng | F16K 37/0041 | |
| 11,781,661 | B1 * | 10/2023 | Zhang | F16K 11/056 | 137/625 |
| 11,814,827 | B2 * | 11/2023 | Wang | E03C 1/023 | |

(Continued)

*Primary Examiner* — Craig M Schneider
*Assistant Examiner* — Andrew J Rost
(74) *Attorney, Agent, or Firm* — Che-Yang Chen; Law Office of Michael Chen

(57) ABSTRACT

A precision ceramic water control valve with dual inlets and dual outlets may include a valve housing, and a rotating seat is installed in the valve housing. A sliding block, a blocking plate, a movable valve piece, and a fixed valve piece are sequentially stacked inside the valve housing beneath the rotating seat. A valve stem pivotally assembled at the central portion of the rotating seat is adapted to upward protrude out of the valve housing, and the valve stem comprises a pulling portion at the lower end thereof to be embedded with the sliding block. The lower end of the valve housing is connected to a first base to prevent the fixed valve piece, the movable valve piece, the blocking plate, the sliding block, and the rotating seat from falling out, and the first base has an inlet chamber, and a balancing valve is installed in the inlet chamber.

10 Claims, 17 Drawing Sheets

(56) References Cited

U.S. PATENT DOCUMENTS

| | | | | |
|---|---|---|---|---|
| 11,846,367 | B2 * | 12/2023 | Kobayashi .......... | F16K 11/0787 |
| 12,467,545 | B1 * | 11/2025 | Chang ................. | F16K 11/0743 |
| 2019/0048565 | A1 * | 2/2019 | Fassolette ............. | F16K 27/045 |
| 2019/0353259 | A1 * | 11/2019 | Cattaneo ............... | F16K 47/026 |

* cited by examiner

A-A

B-B

C-C

D-D

A-A

C-C

D-D

E-E

D-D

F-F

WATER CONTROL VALVE

FIELD OF THE INVENTION

The present invention relates to a water control valve and more particularly to a precision ceramic water control valve designed for switching water sources between two water-using devices.

BACKGROUND OF THE INVENTION

Water-using devices typically provide both cold and hot water for selection, with warm water being obtained by mixing hot water into the cold water supply. This allows for a controlled outflow where cold and hot water are blended in adjustable ratios to achieve the desired temperature. The adjustment of this mixing process is primarily controlled by a precision ceramic water control valve.

However, the conventional water control valve has following disadvantages: A conventional ceramic water control valve can typically supply only one water-using device. If the same cold and hot water source needs to supply two devices simultaneously, a diverter must be installed between the pipelines of the two devices and the water source, or an additional pull-head mechanism must be set up. This significantly increases the complexity of the entire water supply system, and also when using the water, the user must switch between two ceramic valves and the diverter, or may accidentally touch the pull-head, causing inconvenience in operation. Therefore, there remains a need for a new and improved design for a water control valve to overcome the problems presented above.

SUMMARY OF THE INVENTION

The present invention provides a precision ceramic water control valve with dual inlets and outlets comprising a valve housing, and a rotating seat is installed in the valve housing. A sliding block, a blocking plate, a movable valve piece, and a fixed valve piece are sequentially stacked inside the valve housing beneath the rotating seat. A valve stem pivotally assembled at the central portion of the rotating seat is adapted to upward protrude out of the valve housing, and the valve stem comprises a pulling portion at the lower end thereof to be embedded with the sliding block. By connecting the sliding block and the rotating seat respectively to the blocking plate and the movable valve piece, the operation of the valve stem is configured to drive the sliding block to move the blocking plate laterally, and after the lateral movement, the rotating seat is adapted to further drive the movable valve piece to have rotation. The movement of the movable valve piece is adapted to change the alignment positions between the movable valve piece and the fixed valve piece, thereby controlling the opening and closing the water flow, adjusting the mixing ratio of hot and cold water, and adjusting the water output flow rate. The lower end of the valve housing is connected to a first base to prevent the fixed valve piece, the movable valve piece, the blocking plate, the sliding block, and the rotating seat from falling out. The first base has an inlet chamber, and a balancing valve is installed in the inlet chamber. When in use, the water control valve is placed into a valve chamber reserved within a diverter valve seat, and the diverter valve seat comprises a cold water inlet passage, a hot water inlet passage, a first outlet passage, and a second outlet passage respectively extending outward from the bottom surface of the valve chamber, and the cold water inlet passage and the hot water inlet passage are respectively connected to cold and hot water sources, while each of the first outlet passage and the second outlet passage is connected to a water-using device, so that by operation the water control valve, cold water, hot water, or mixed warm water is configured to be directed to one of the two water-using devices through the diverter valve seat. The valve housing comprises a first chamber formed therein, and a top opening is formed on the top of the valve housing through an annular wall, and the outer diameter of the annular wall is smaller than the valve housing. The rotating seat, the sliding block, the blocking plate, the movable valve piece, and the fixed valve piece, are sequentially placed into the first chamber of the valve housing, and the valve stem is adapted to upward extend out of the valve housing through the top opening. A recess portion is upward formed on the lower end of the blocking plate. The movable valve piece has a first hole and a second hole penetrating therethrough, and when the water control valve is in default unused state, the recess portion of the blocking plate is misaligned with the first hole, so as to prevent the outflow of both the cold and hot water sources, achieving a shut-off effect. The fixed valve piece comprises a cold water hole, two hot water holes, a first water outlet hole, and a second water outlet hole penetrating therethrough, and the two hot water holes are communicated, and the cold water hole is positioned on one side of and between the two hot water holes, and the first water outlet hole and the second water outlet hole are located on the other side of the two hot water holes. When the fixed valve piece and the movable valve piece are stacked and the water control valve is in the closed position, the cold water hole of the fixed valve piece is adapted to align with the first hole of the movable valve piece, while the two hot water holes, the first water outlet hole, and the second water outlet hole are misaligned with the first hole and the second hole, and the both the cold and hot water sources are effectively blocked, preventing any flow of water out from the water control valve through the diverter valve seat. The first base comprises a cold water inlet, a hot water inlet, a first outlet, and a second outlet, and an inlet chamber is formed inside the first base, and the cold water inlet and the hot water inlet are communicated with the inlet chamber. When the rotating seat, the sliding block, the blocking plate, the movable valve piece, and the fixed valve piece are sequentially stacked within the first chamber, the combination of the valve housing and the first base allows the base to support the fixed valve piece, the movable valve piece, the blocking plate, the sliding block, and the rotating seat, so that the fixed valve piece is securely positioned on the first base and the cold water inlet, the hot water inlet, the first outlet, and the second outlet are respectively aligned with the cold water hole, the hot water holes, the first water outlet hole, and the second water outlet hole. When the water control valve is placed into the valve chamber of the diverter valve seat, the cold water inlet passage, the hot water inlet passage, the first outlet passage, and the second outlet passage are respectively aligned with the cold water inlet, the hot water inlet, the first outlet, and the second outlet of the first base, forming either a direct or indirect communicated, so as to form a dual inlets and outlets water control valve.

Comparing with conventional water control valve, the present invention is advantageous because: (i) the water control valve of the present invention can control two water-using devices, with the function of mixing cold and hot water, so that the user has no need to install a splitter between the water-using devices and the cold and hot water pipelines or to set up an additional pull handle, so as to effectively simplify the complexity of the entire pipeline, and to eliminate the worry about accidentally triggering the pull handle; (ii) when using water, the user no longer needs to switch between the two water control valves and simply rotates one handle in two directions to control two water-using devices, which saves time and effort; and (iii) the water control valve is controlled by pulling and rotating the valve stem, which can easily achieve the needs of different consumers.

DETAILED DESCRIPTION OF THE INVENTION

Figure 1:
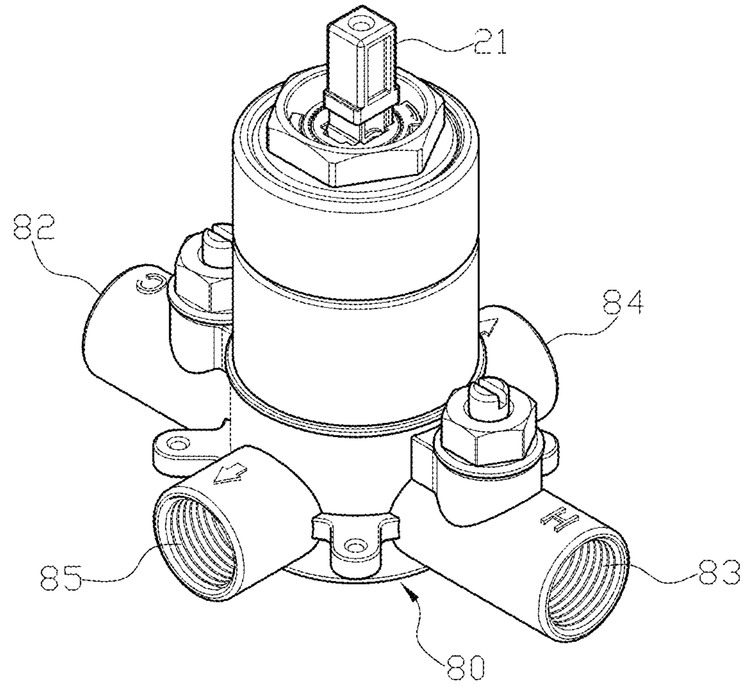
FIG. 1 is a three-dimensional assembly diagram of a water control valve of the present invention placed in a diverter valve seat for use.
Figure 2:
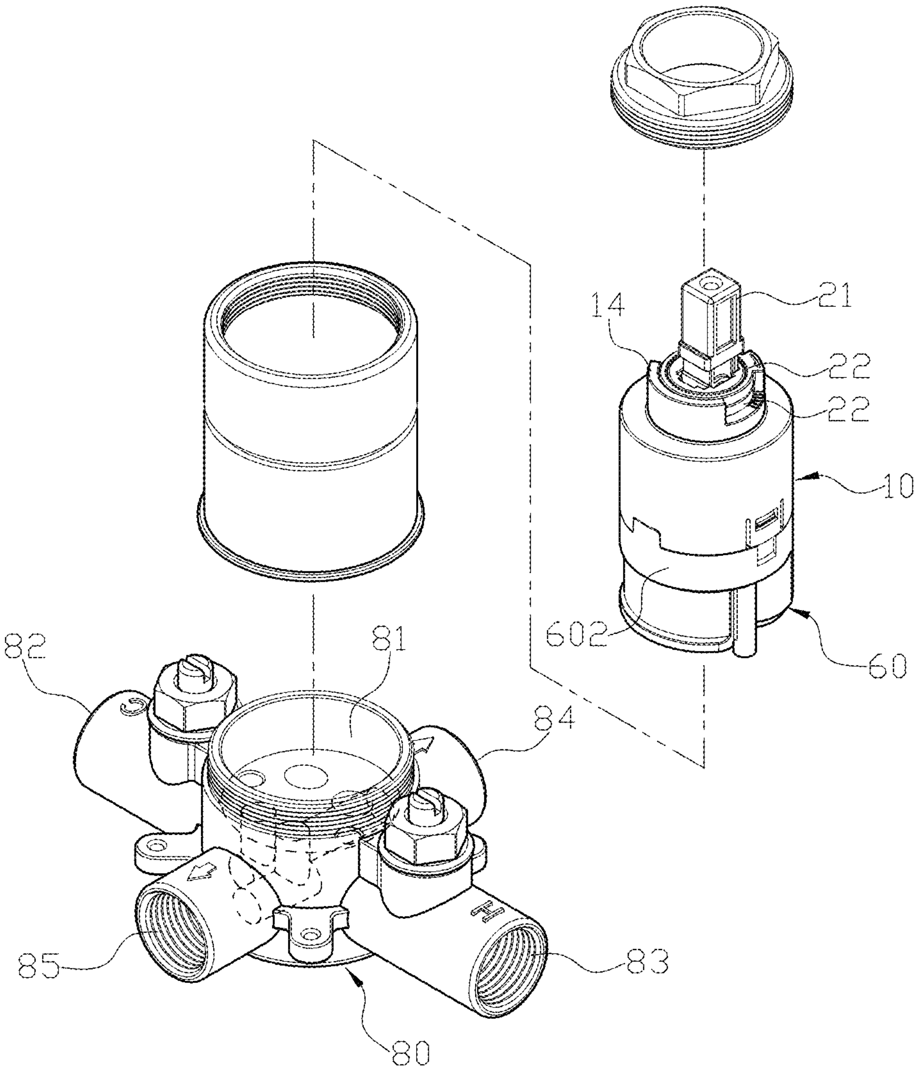
FIG. 2 is a status diagram of the water control valve of the present invention when placed in the diverter valve seat for use.
Figure 3:
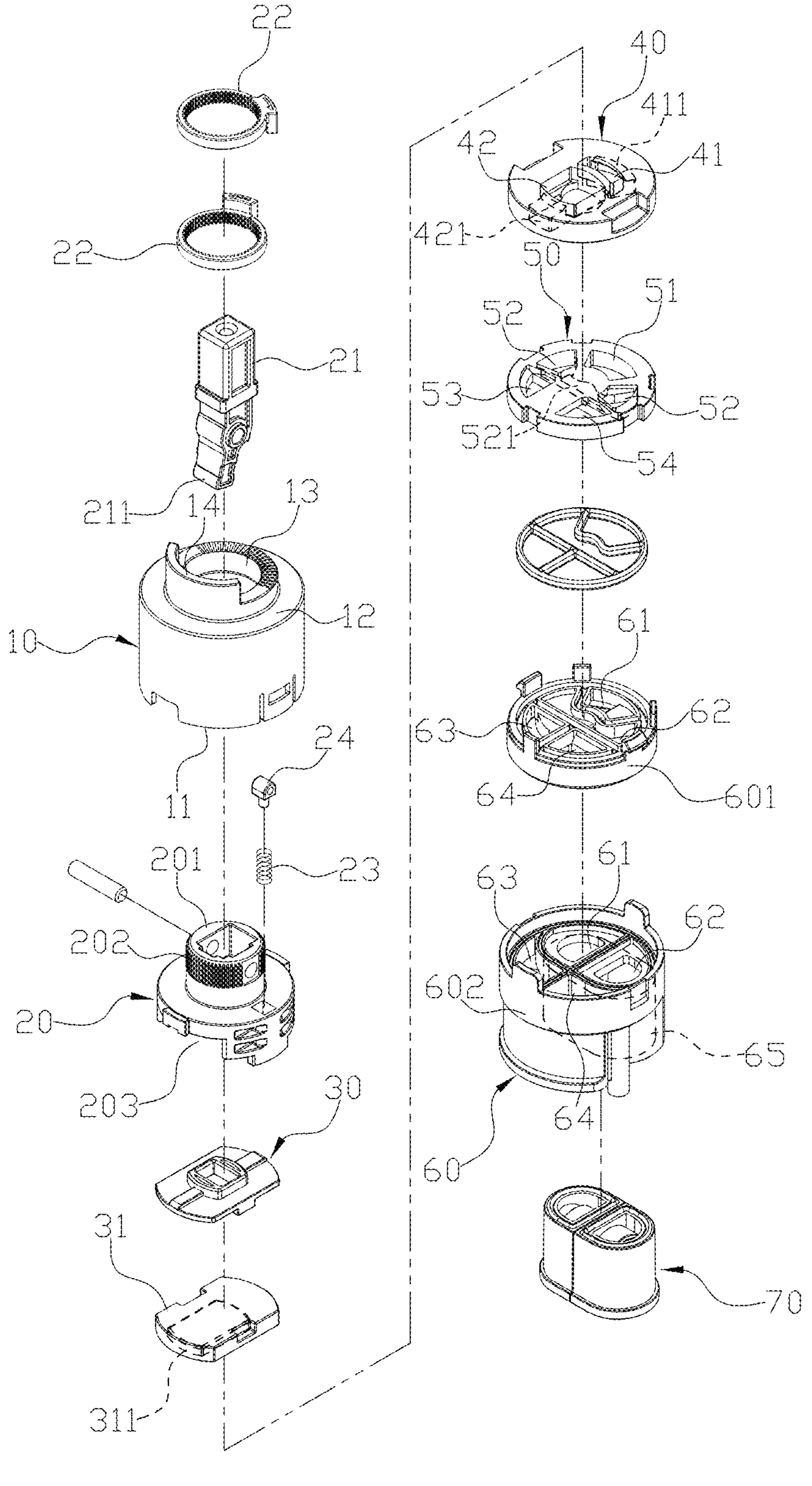
FIG. 3 is an exploded three-dimensional view of the water control valve of the present invention.
Figure 4:
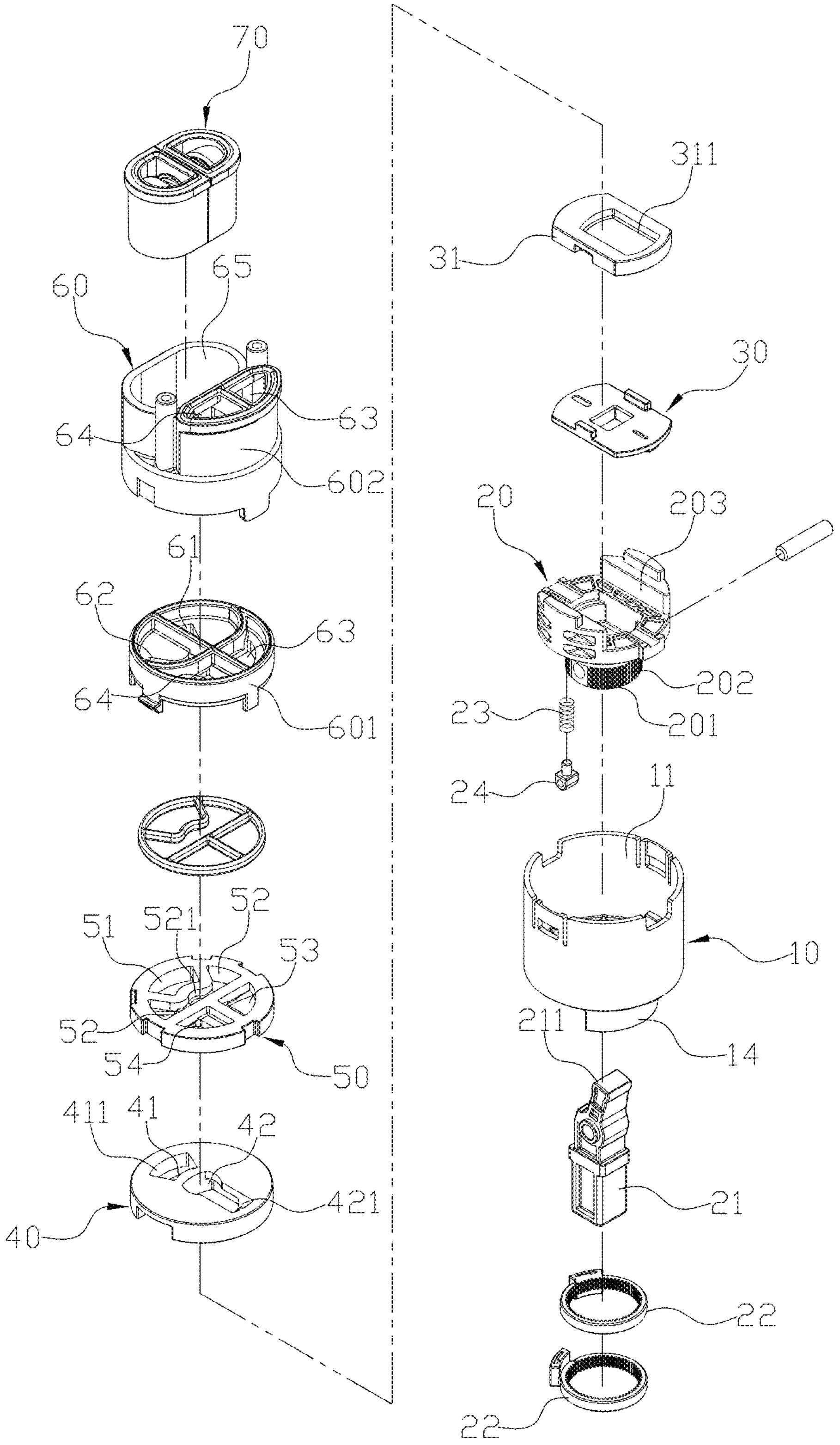
FIG. 4 is an exploded three-dimensional view of the water control valve of the present invention from another angle.
Figure 5:
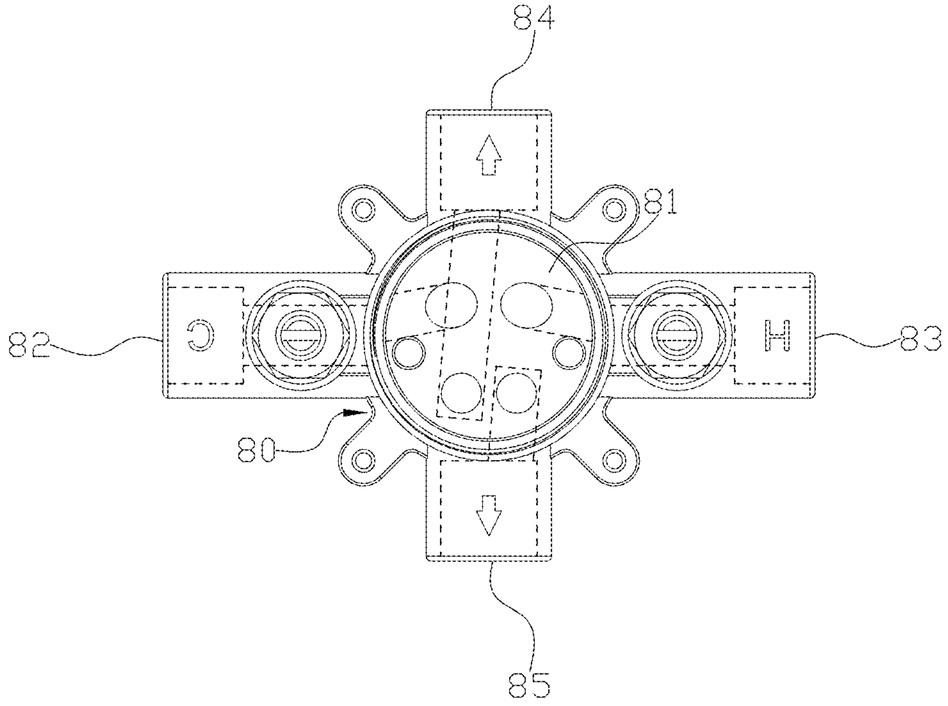
FIG. 5 is a plan view of the diverter valve seat of the water control valve of the present invention.
Figure 6:
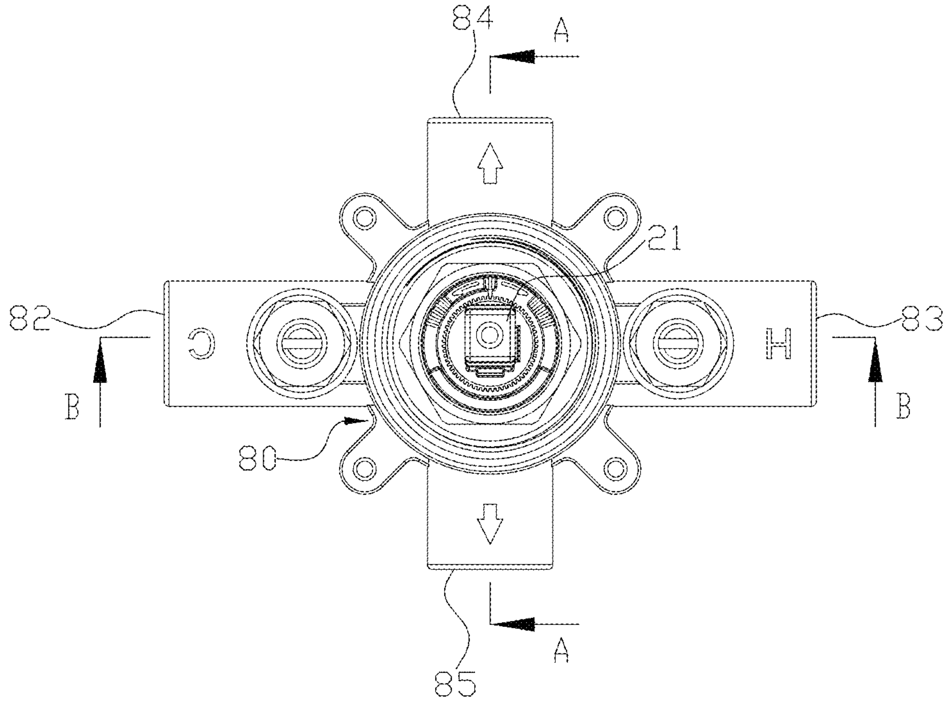
FIG. 6 is a combined plan view of the water control valve of the present invention placed in the diverter valve seat for use.
Figure 7:
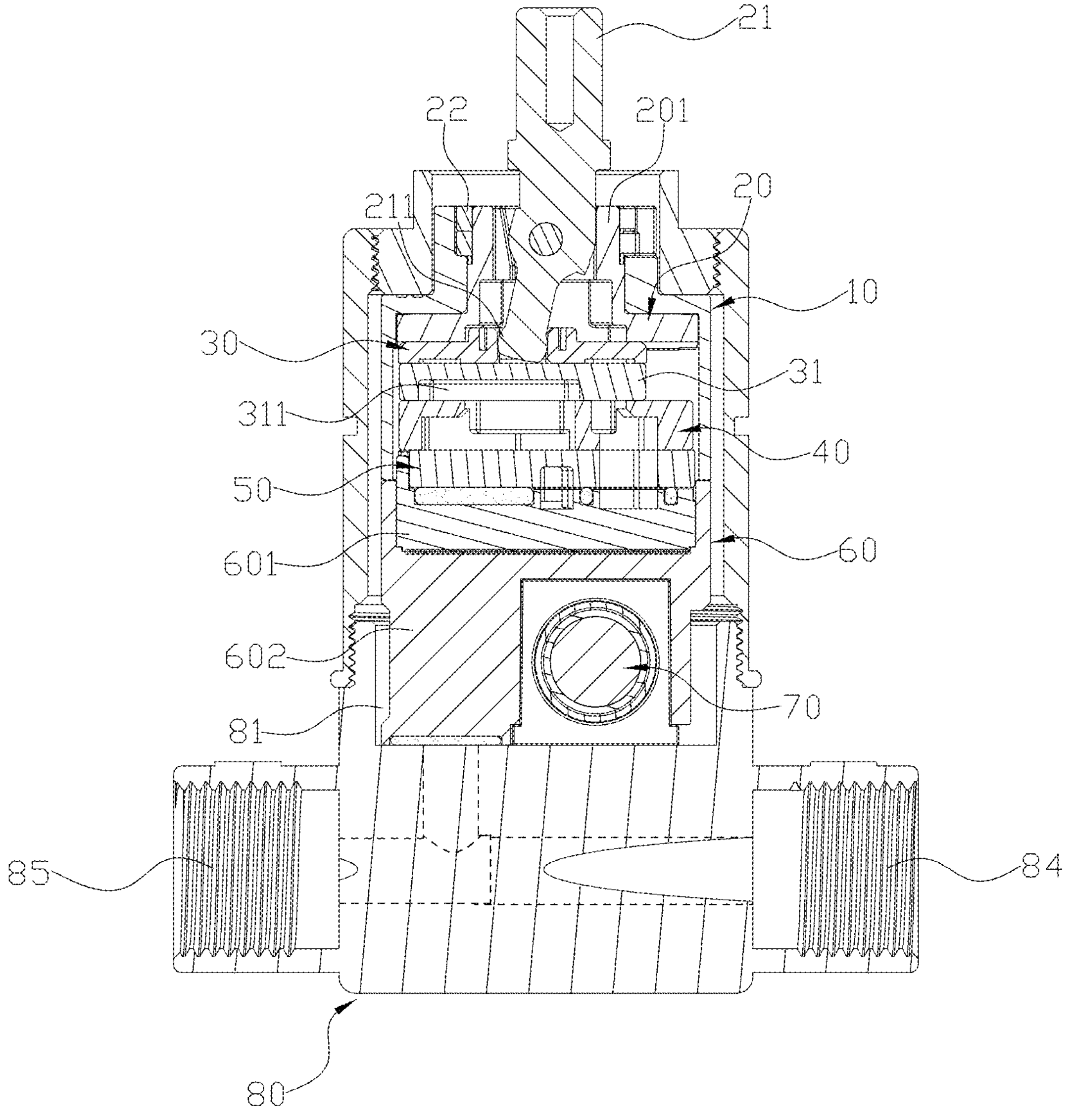
FIG. 7 is a sectional assembly view of the water control valve of the present invention placed in the diverter valve seat for use.
Figure 8:
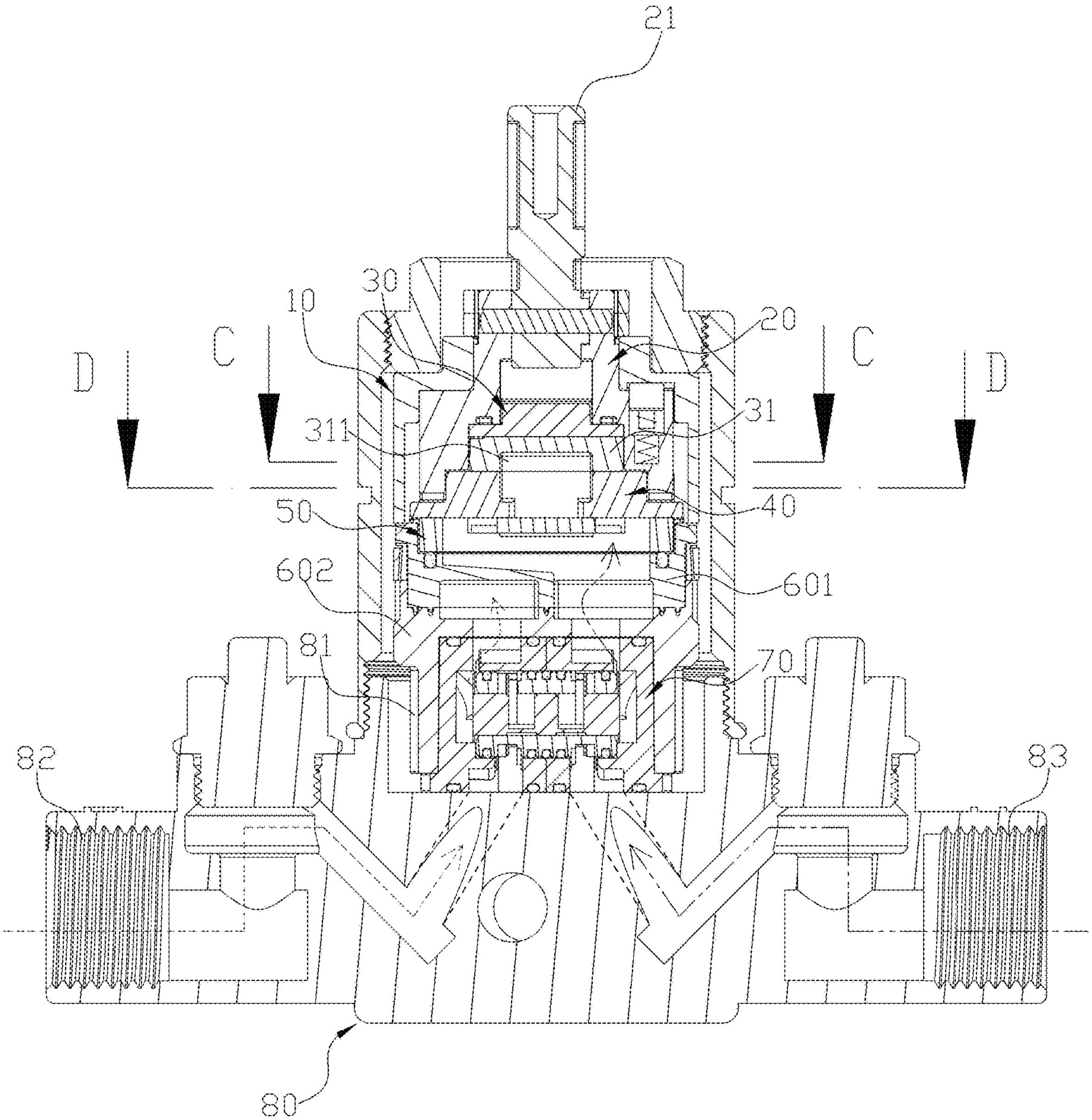
FIG. 8 is a sectional assembly view of the water control valve of the present invention placed in the diverter valve seat for use from another angle.
Figure 9:
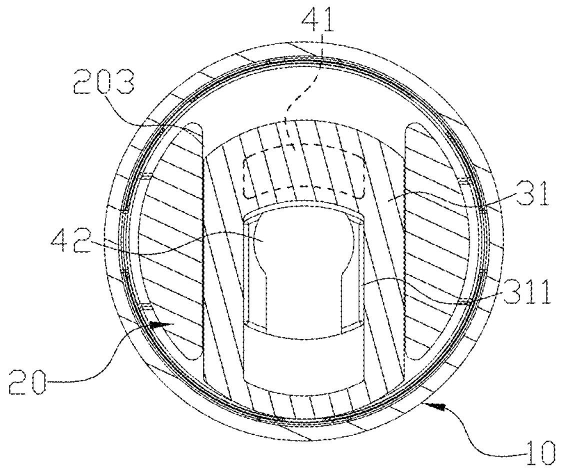
FIG. 9 is a first schematic view illustrating the alignments of holes of the water control valve of the present invention when the water is shut off.
Figure 10:
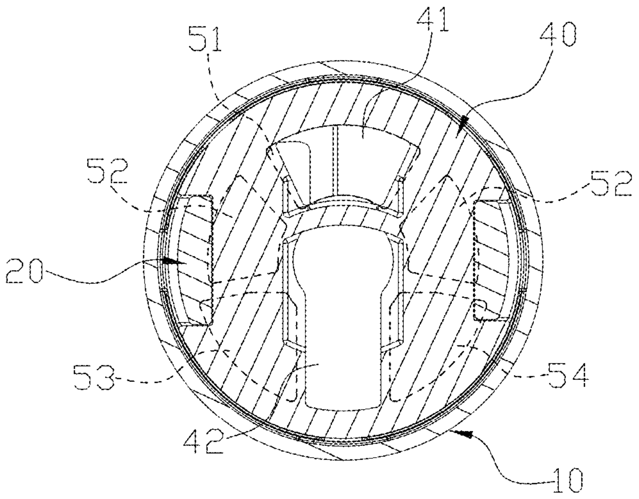
FIG. 10 is a second schematic view illustrating the alignments of holes of the water control valve of the present invention when the water is shut off.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 10, the present invention provides a precision ceramic water control valve with dual inlets and dual outlets comprising a valve housing (10), and a rotating seat (20) is installed in the valve housing (10). A sliding block (30), a blocking plate (31), a movable valve piece (40), and a fixed valve piece (50) are sequentially stacked inside the valve housing (10) beneath the rotating seat (20). A valve stem (21) pivotally assembled at the central portion of the rotating seat (20) is adapted to upward protrude out of the valve housing (10), and the valve stem (21) comprises a pulling portion (211) at the lower end thereof to be embedded with the sliding block (30). Moreover, by connecting the sliding block (30) and the rotating seat (20) respectively to the blocking plate (31) and the movable valve piece (40), the operation of the valve stem (21) is configured to drive the sliding block (30) to move the blocking plate (31) laterally. After the lateral movement, the rotating seat (20) is adapted to further drive the movable valve piece (40) to have rotation. The movement of the movable valve piece (40) is adapted to change the alignment positions between the movable valve piece (40) and the fixed valve piece (50), thereby controlling the opening and closing the water flow, adjusting the mixing ratio of hot and cold water, and adjusting the water output flow rate. In addition, the lower end of the valve housing (10) is connected to a first base (60) to prevent the fixed valve piece (50), the movable valve piece (40), the blocking plate (31), the sliding block (30), and the rotating seat (20) from falling out. The first base (60) has an inlet chamber (65), and a balancing valve (70) is installed in the inlet chamber (65).

When in use, the water control valve is placed into a valve chamber (81) reserved within a diverter valve seat (80), and the diverter valve seat (80) comprises a cold water inlet passage (82), a hot water inlet passage (83), a first outlet passage (84), and a second outlet passage (85) respectively extending outward from the bottom surface of the valve chamber (81), and the cold water inlet passage (82) and the hot water inlet passage (83) are respectively connected to cold and hot water sources, while each of the first outlet passage (84) and the second outlet passage (85) is connected to a water-using device, so that by operation the water control valve, cold water, hot water, or mixed warm water is configured to be directed to one of the water-using devices through the diverter valve seat (80). Furthermore, the valve housing (10) comprises a first chamber (11) formed therein, and a top opening (13) is formed on the top of the valve housing (10) through an annular wall (12), and the outer diameter of the annular wall (12) is smaller than the valve housing (10). The rotating seat (20), the sliding block (30), the blocking plate (31), the movable valve piece (40), and the fixed valve piece (50), are sequentially placed into the first chamber (11) of the valve housing (10), and the valve stem (21) is adapted to upward extend out of the valve housing (10) through the top opening (13). Also, a recess portion (311) is upward formed on the lower end of the blocking plate (31). The movable valve piece (40) has a first hole (41) and a second hole (42) penetrating therethrough, and when the water control valve is in default unused state, the recess portion (311) of the blocking plate (31) is misaligned with the first hole (41), so as to prevent the outflow of both the cold and hot water sources, achieving a shut-off effect. The fixed valve piece (50) comprises a cold water hole (51), two hot water holes (52), a first water outlet hole (53), and a second water outlet hole (54) penetrating therethrough, and the two hot water holes (52) are communicated, and the cold water hole (51) is positioned on one side of and between the two hot water holes (52). Moreover, the first water outlet hole (53) and the second water outlet hole (54) are located on the other side of the two hot water holes (52). When the fixed valve piece (50) and the movable valve piece (40) are stacked and in the closed position, the cold water hole (51) of the fixed valve piece (50) is adapted to align with the first hole (41) of the movable valve piece (40), while the two hot water holes (52), the first water outlet hole (53), and the second water outlet hole (54) are misaligned with the first hole (41) and the second hole (42), and the both the cold and hot water sources are effectively blocked, preventing any flow of water out from the water control valve through the diverter valve seat (80).

The first base (60) comprises a cold water inlet (61), a hot water inlet (62), a first outlet (63), and a second outlet (64), and an inlet chamber (65) is formed inside the first base (60), and the cold water inlet (61) and the hot water inlet (62) are communicated with the inlet chamber (65). When the rotating seat (20), the sliding block (30), the blocking plate (31), the movable valve piece (40), and the fixed valve piece (50) are sequentially stacked within the first chamber (11), the combination of the valve housing (10) and the first base (60) allows the base (60) to support the fixed valve piece (50), the movable valve piece (40), the blocking plate (31), the sliding block (30), and the rotating seat (20), so that the fixed valve piece (50) is securely positioned on the first base (60) and the cold water inlet (61), the hot water inlet (62), the first outlet (63), and the second outlet (64) are respectively aligned with the cold water hole (51), the hot water holes (52), the first water outlet hole (53), and the second water outlet hole (54). Also, when the water control valve is placed into the valve chamber (81) of the diverter valve seat (80), the cold water inlet passage (82), the hot water inlet passage (83), the first outlet passage (84), and the second outlet passage (85) are respectively aligned with the cold water inlet (61), the hot water inlet (62), the first outlet (63), and the second outlet (64) of the first base (60), forming either a direct or indirect communicated. (This is because the cold water inlet (61) and the hot water inlet (62) of the first base (60) are indirectly communicated with the cold water inlet passage (82) and the hot water inlet passage (83) of the diverter valve seat (80) through the balancing valve (70).)

In one embodiment, a locating block (14) is extended from a side of the top opening (13), and the rotating seat (20) is formed with a neck portion (201) that reduces in diameter, and the neck portion (201) protrudes out from the top opening (13), and a toothed edge (202) is formed on the outer periphery of the neck portion (201) to allow two toothed ring (22) to be engaged with the toothed edge (202) so as to secure the positions thereof, and the two toothed rings (22) are adapted to be upward disengaged from the rotating seat (20) and re-engaged to adjust the temperature limit angle according to actual usage needs.

In another embodiment, a groove (203) is formed on a lower end of the rotating seat (20) to accommodate the sliding block (30) and the blocking plate (31), so that the sliding block (30) and the blocking plate (31) are adapted to be driven by the valve stem (21) to move laterally within the groove (203).

In still another embodiment, the rotating seat (20) has a spring (23) coupled thereon, and a positioning pin (24) is elastically abutted against the spring (23).

In a further embodiment, the first hole (41) and the second hole (42) of the movable valve piece (40) respectively have a first expansion portion (411) and a second expansion portion (421) outwardly extended from one side of hole edges of the first hole (41) and the second hole (42), and the first expansion portion (411) and the second expansion portion (421) are recessed upward from the bottom portions of the movable valve piece (40) so as to increase the coverage areas of the first hole (41) and the second holes (42).

In still a further embodiment, the bottom surface of the fixed valve piece (50) is recessed with a flow passage (521), and the two hot water holes (52) are communicated through the flow passage (521).

In a preferred embodiment, the first base (60) is formed by assembling an upper base (601) and a lower base (602) together, and the cold water inlet (61), the hot water inlet (62), the first outlet (63), and the second outlet (64) are positioned correspondingly between the upper base (601) and the lower base (602).

In another preferred embodiment, after fitted together, the upper base (601) and the lower base (602) are connected together through ultrasonic welding.

In an advantageous embodiment, the water control valve is connected to two check valves (100) through an adapter seat (90), and the water control valve with the adapter seat (90) and the check valve (100) is installed into the valve chamber (81) of the diverter valve seat (80). The adapter seat (90) comprises a cold water port (91), a hot water port (92), a first outlet port (93), and a second outlet port (94), so that the first base (60) and the diverter valve seat (80) are connected and communicated through the cold water port (91), the hot water port (92), the first outlet port (93), and the second outlet port (94). Also, each of the cold water port (91) and the hot water port (92) has one check valve (100) installed therein (as shown in FIGS. 17 to 20) to achieve the effect of preventing water backflow.

In another advantageous embodiment, the adapter seat (90) is formed by assembling an upper seat (901) and a lower seat (902) together, and the cold water port (91), the hot water port (92), the first outlet port (93), and the second outlet port (94) are positioned correspondingly between the upper seat (901) and the lower seat (902).

In still another advantageous embodiment, after fitted together, the upper seat (901) and the lower seat (902) are connected together through ultrasonic welding.

In a particular embodiment, the diverter valve seat (80) is embedded in the wall, and the first outlet passage (84) is connected to a lower water outlet faucet (one water-using device), while the second outlet passage (85) is connected to a wall-mounted showerhead (the other water-using device).

Figure 11:
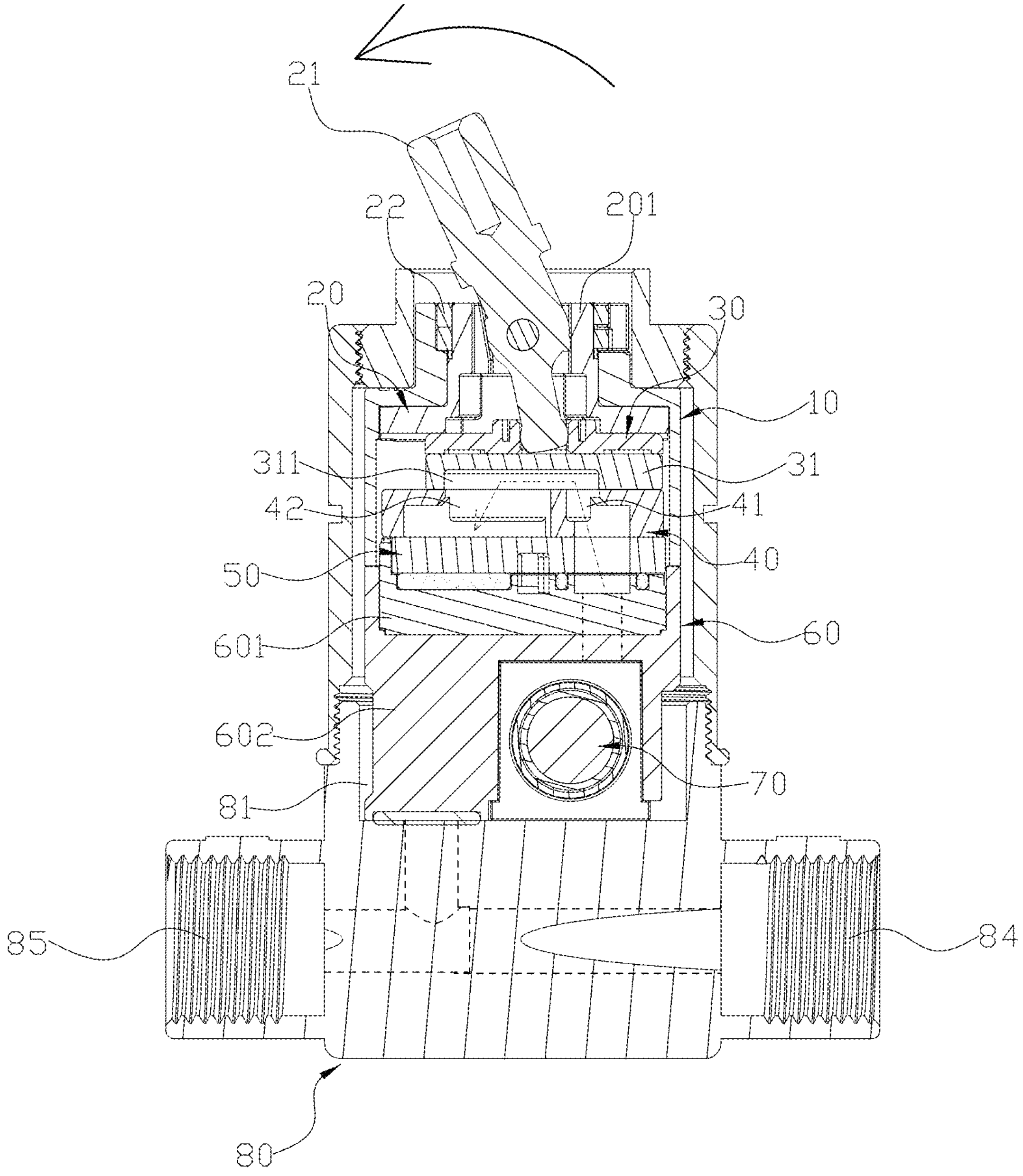
FIG. 11 is a schematic diagram illustrating a handle of the water control valve of the present is upward-pulled.
Figure 12:
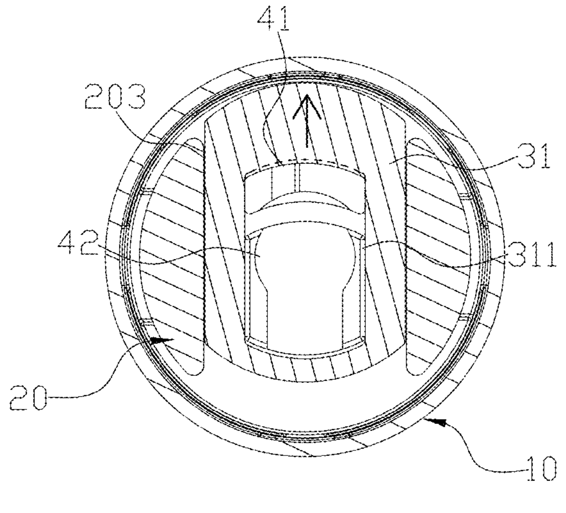
FIG. 12 is a diagram showing the movement of a blocking plate when it is driven.
Figure 13:
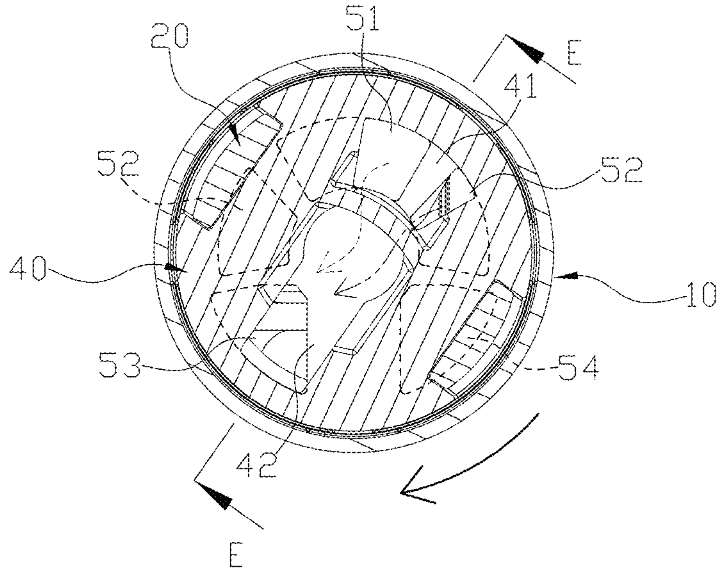
FIG. 13 is a positioning diagram of the water control valve of the present invention showing cold and hot water mixing before flowing into a water-using device.
Figure 14:
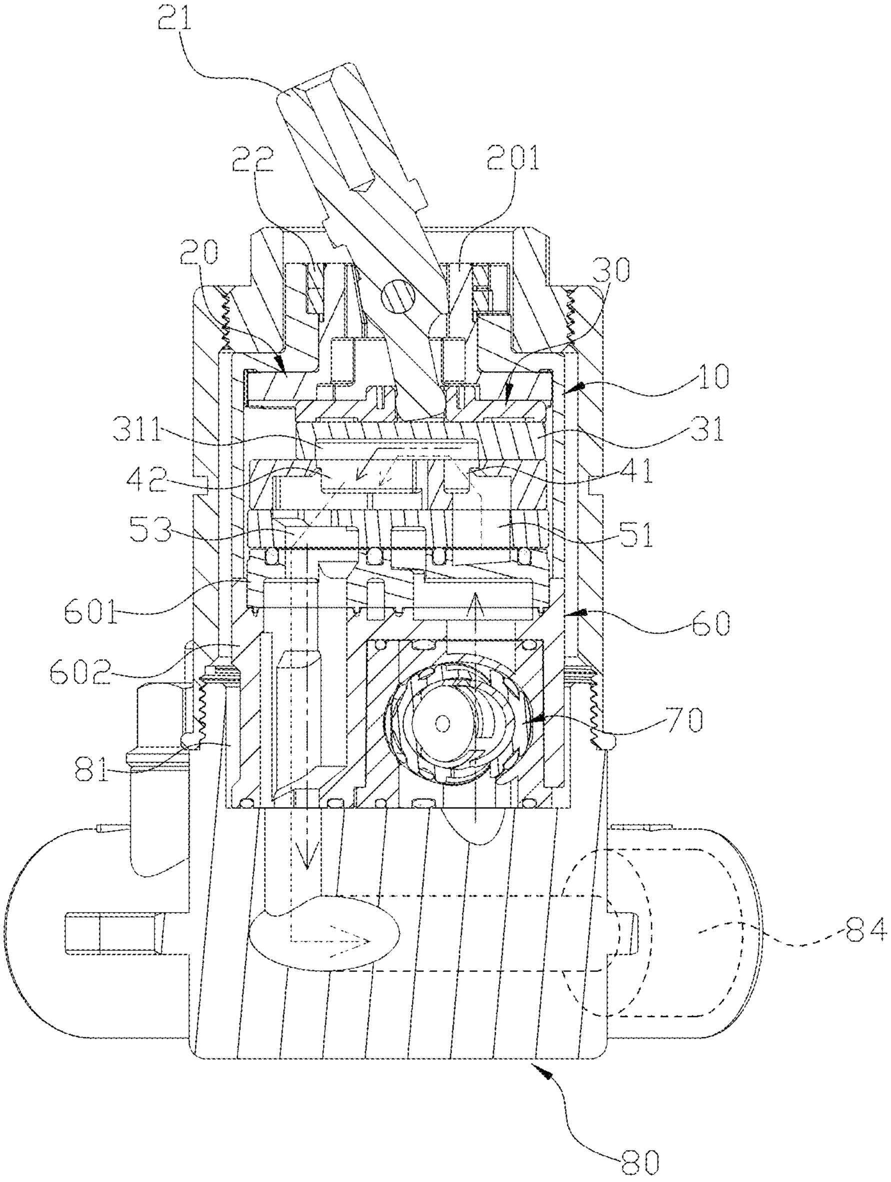
FIG. 14 is a status diagram of the water control valve of the present invention supplying water to a water-using device.

In actual application, the water control valve of the present invention is installed in the valve chamber (81) of the diverter valve seat (80), and the valve stem (21) is connected to a handle. The operation of the handle allows the diverter valve seat (80) to select one of the water-using devices for water supply, and during water supply, the handle can also adjust the mixing ratio of cold and hot water to achieve the desired water temperature. When one of the water-using devices is to be used, the handle is first pulled up, and the valve stem (21) is configured to drive the blocking plate (31) to move laterally through the sliding block (30), and the recess portion (311) is adapted to be simultaneously aligned with and communicated with the first hole (41) and the second hole (42) of the movable valve piece (50) (as shown in FIGS. 11 and 12). Thereafter, the handle is rotated in one direction, and the valve stem (21) is rotated to drive the rotating seat (20) with the movable valve piece (40) to have rotation together, and the first hole (41) and the second hole (42) are respectively aligned with the cold water hole (51) and the first water outlet hole (53), so that the cold water is adapted to flow from the cold water inlet passage (82), the balancing valve (70), the cold water inlet (61), and the cold water hole (51) through first hole (41), the recess portion (311), the second hole (42), the first water outlet hole (53), the first outlet (63), and the first outlet passage (84) of the diverter valve seat (80) to enter one of the water-using devices. Also, the rotation of the movable valve piece (40) is not sufficient to algin the first hole (41) and the second hole (42) with the second water outlet hole (54), such that neither cold nor hot water will flow through the second water outlet hole (54) and the diverter valve seat (80) into the other water-using device. Moreover, during the water supply process of the water-using device, in case that warm water or hot water is needed, further rotation of the handle allows the first hole (41) to gradually overlap with one of the hot water holes (52), and the area of overlap can be adjusted based on the extent of the rotation. When the first hole (41) is simultaneously communicated with the cold water hole (51) and the hot water hole (52) (as shown in FIGS. 13 and 14), cold and hot water will mix to form warm water for use. When the handle is turned to its maximum travel position, the first hole (41) is adapted to completely bypass the cold water hole (51), and only hot water will flow out for use. The water flow is shut off when the handle is turned back and pressed down.

Figure 15:
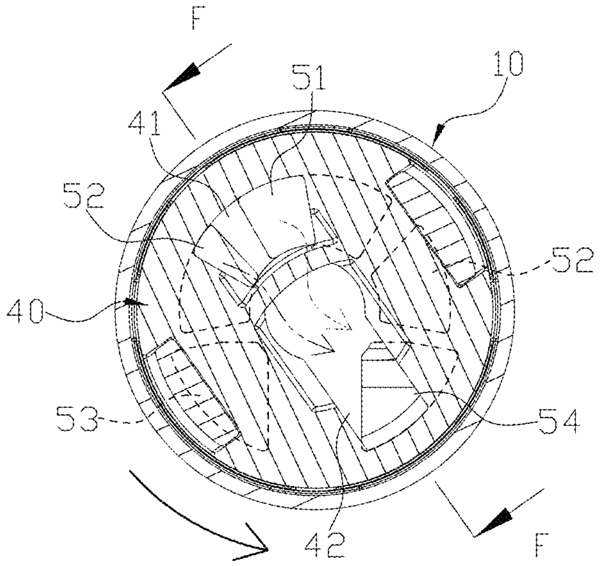
FIG. 15 is a positioning diagram of the water control valve of the present invention showing cold and hot water mixing before flowing into the other water-using device.
Figure 16:
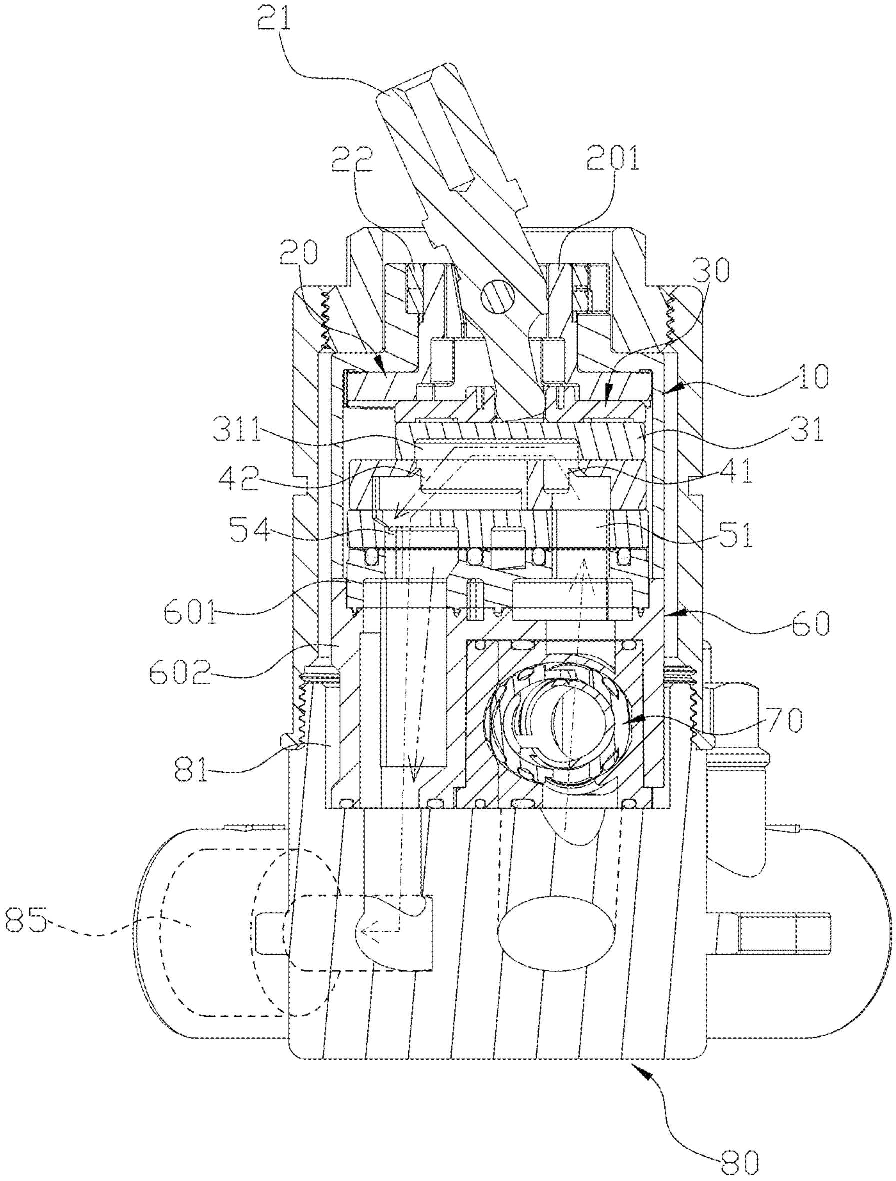
FIG. 16 is a status diagram of the water control valve of the present invention supplying water to the other water-using device.
Figure 17:
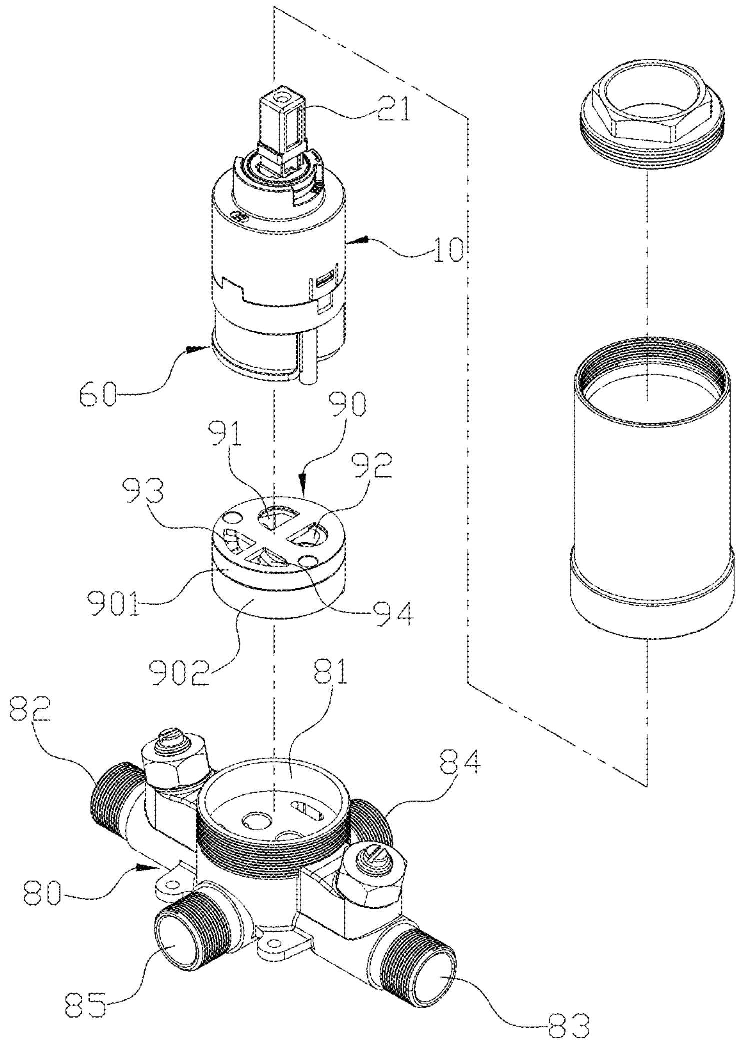
FIG. 17 is a diagram of another preferred embodiment of the water control valve of the present invention.
Figure 18:
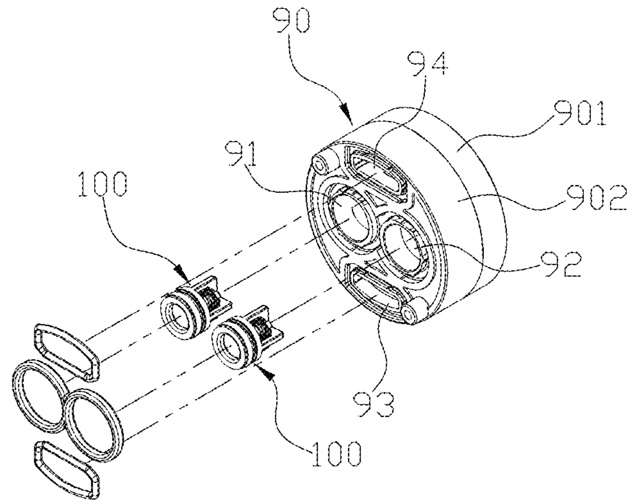
FIG. 18 is an exploded three-dimensional view of another preferred embodiment of the water control valve of the present invention.
Figure 19:
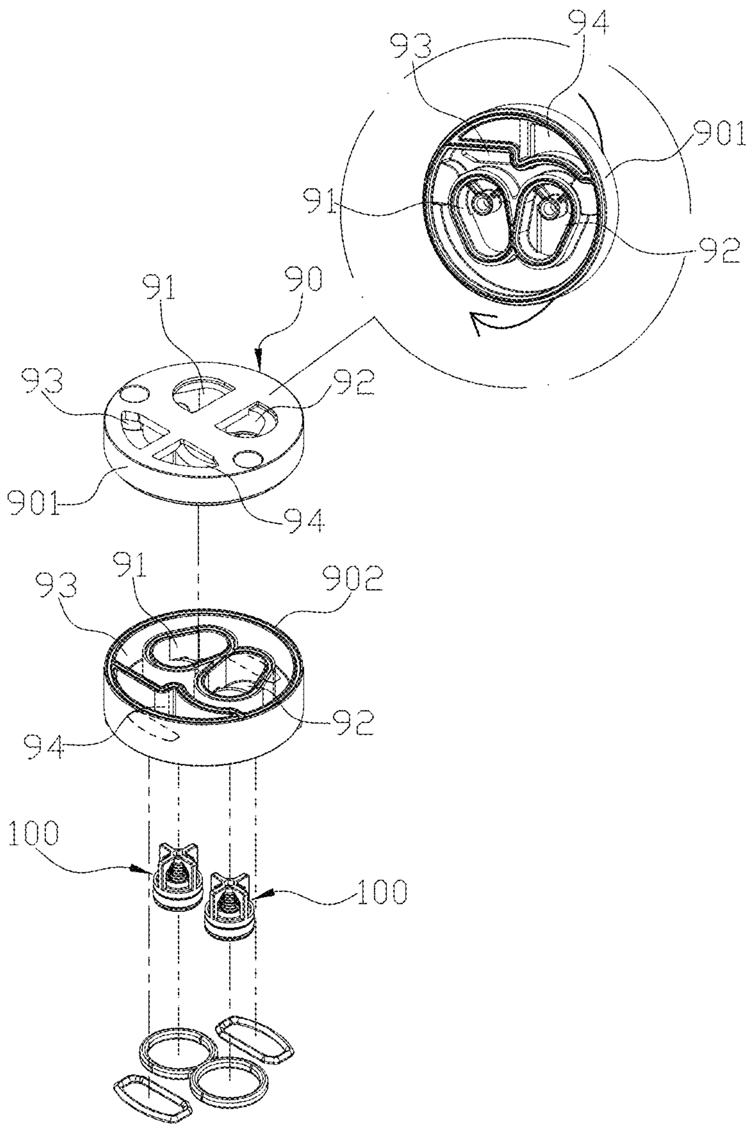
FIG. 19 is a detailed exploded view of another preferred embodiment of the water control valve of the present invention.
Figure 20:
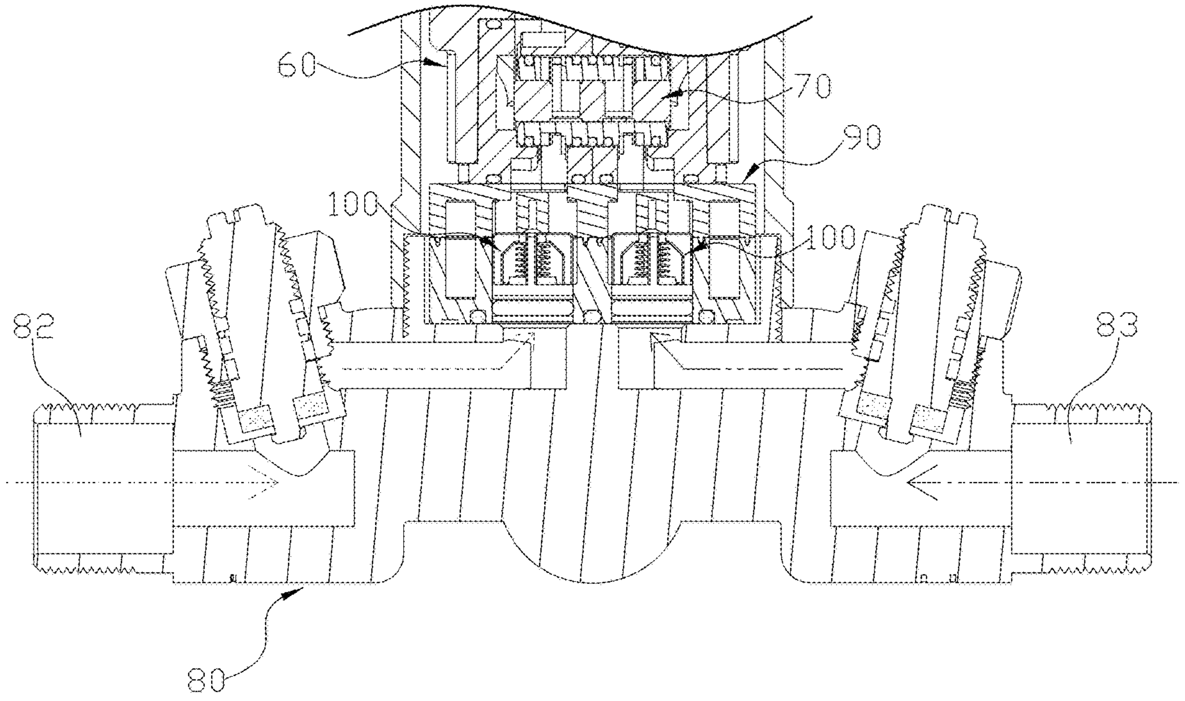
FIG. 20 is a sectional assembly view of another preferred embodiment of the water control valve of the present invention placed in the diverter valve seat for use.

Similarly, during use, in case that the water source needs to be directed to the other water-using device, the handle is first pulled up and then rotated in the opposite direction, and the first hole (41) and the second hole (42) are respectively aligned with the cold water hole (51) and the second water outlet hole (54), or the first hole (41) is aligned with the cold water hole (51) and the other hot water hole (52) while the second hole (42) is aligned with the second water outlet hole (54) (as shown in FIGS. 15 and 16), or the first hole (41) and the second hole (42) are respectively aligned with the other hot water hole (52) and the second water outlet hole (54), so as to allow cold water, mixed warm water, or hot water to flow through second water outlet hole (54), the second outlet (64), and second outlet passage (85) to enter the other water-using device. Furthermore, by utilizing the two toothed rings (22) in the rotation of the valve stem (21) to drive the rotating seat (20) in each two directions, the two lateral ends of the locating block (14) are adapted to stop the rotation, so as to prevent hot water from immediately turning to its maximum when opened, which could easily cause accidentally scalding. In addition, the change in angle, separated by the two toothed rings (22), allows for adjustment of the highest water temperature of hot water according to the individual's needs.

Comparing with conventional water control valve, the present invention is advantageous because: (i) the water control valve of the present invention can control two water-using devices, with the function of mixing cold and hot water, so that the user has no need to install a splitter between the water-using devices and the cold and hot water pipelines or to set up an additional pull handle, so as to effectively simplify the complexity of the entire pipeline, and to eliminate the worry about accidentally triggering the pull handle; (ii) when using water, the user no longer needs to switch between the two water control valves and simply rotates one handle in two directions to control two water-using devices, which saves time and effort; and (iii) the water control valve is controlled by pulling and rotating the valve stem (21), which can easily achieve the needs of different consumers.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water control valve comprising a valve housing, a rotating seat, a sliding block, a blocking plate, a movable valve piece, a fixed valve piece, and a first base;

wherein the rotating seat is installed in the valve housing, and the sliding block, the blocking plate, the movable valve piece, and the fixed valve piece are sequentially stacked inside the valve housing beneath the rotating seat; a valve stem pivotally assembled at the central portion of the rotating seat is adapted to upward protrude out of the valve housing, and the valve stem comprises a pulling portion at the lower end thereof to be embedded with the sliding block; by connecting the sliding block and the rotating seat respectively to the blocking plate and the movable valve piece, the operation of the valve stem is configured to drive the sliding block to move the blocking plate laterally, and after the lateral movement, the rotating seat is adapted to further drive the movable valve piece to have rotation; the movement of the movable valve piece is adapted to change the alignment positions between the movable valve piece and the fixed valve piece, thereby controlling the opening and closing the water flow, adjusting the mixing ratio of hot and cold water, and adjusting the water output flow rate; the lower end of the valve housing is connected to the first base to prevent the fixed valve piece, the movable valve piece, the blocking plate, the sliding block, and the rotating seat from falling out; the first base has an inlet chamber, and a balancing valve is installed in the inlet chamber; when in use, the water control valve is placed into a valve chamber reserved within a diverter valve seat, and the diverter valve seat comprises a cold water inlet passage, a hot water inlet passage, a first outlet passage, and a second outlet passage respectively extending outward from the bottom surface of the valve chamber, and the cold water inlet passage and the hot water inlet passage are respectively connected to cold and hot water sources, while each of the first outlet passage and the second outlet passage is connected to a water-using device, so that by operation the water control valve, cold water, hot water, or mixed warm water is configured to be directed to one of the two water-using devices through the diverter valve seat;

wherein the valve housing comprises a first chamber formed therein, and a top opening is formed on the top of the valve housing through an annular wall, and the outer diameter of the annular wall is smaller than the valve housing; the rotating seat, the sliding block, the blocking plate, the movable valve piece, and the fixed valve piece, are sequentially placed into the first chamber of the valve housing, and the valve stem is adapted to upward extend out of the valve housing through the top opening;

wherein a recess portion is upward formed on the lower end of the blocking plate; the movable valve piece has a first hole and a second hole penetrating therethrough, and when the water control valve is in default unused state, the recess portion of the blocking plate is misaligned with the first hole, so as to prevent the outflow of both the cold and hot water sources, achieving a shut-off effect;

wherein the fixed valve piece comprises a cold water hole, two hot water holes, a first water outlet hole, and a second water outlet hole penetrating therethrough, and the two hot water holes are communicated, and the cold water hole is positioned on one side of and between the two hot water holes, and the first water outlet hole and the second water outlet hole are located on the other side of the two hot water holes; when the fixed valve piece and the movable valve piece are stacked and the water control valve is in the closed position, the cold water hole of the fixed valve piece is adapted to align with the first hole of the movable valve piece, while the two hot water holes, the first water outlet hole, and the second water outlet hole are misaligned with the first hole and the second hole, and the both the cold and hot water sources are effectively blocked, preventing any flow of water out from the water control valve through the diverter valve seat; and wherein the first base comprises a cold water inlet, a hot water inlet, a first outlet, and a second outlet, and an inlet chamber is formed inside the first base, and the cold water inlet and the hot water inlet are communicated with the inlet chamber; when the rotating seat, the sliding block, the blocking plate, the movable valve piece, and the fixed valve piece are sequentially stacked within the first chamber, the combination of the valve housing and the first base allows the base to support the fixed valve piece, the movable valve piece, the blocking plate, the sliding block, and the rotating seat, so that the fixed valve piece is securely positioned on the first base and the cold water inlet, the hot water inlet, the first outlet, and the second outlet of the first base are respectively aligned with the cold water hole, the hot water holes, the first water outlet hole, and the second water outlet hole of the fixed valve piece; when the water control valve is placed into the valve chamber of the diverter valve seat, the cold water inlet passage, the hot water inlet passage, the first outlet passage, and the second outlet passage of the diverter valve seat are respectively aligned and communicated with the cold water inlet, the hot water inlet, the first outlet, and the second outlet of the first base.

2. The water control valve of claim 1, wherein a locating block is extended from a side of the top opening, and the rotating seat is formed with a neck portion which has an outer diameter smaller than the rotating seat, and the neck portion protrudes out from the top opening, and a toothed edge is formed on the outer periphery of the neck portion to allow two toothed ring to be engaged with the toothed edge so as to secure the positions thereof, and the two toothed rings are adapted to be upward disengaged from the rotating seat and re-engaged to adjust the temperature limit angle according to actual usage needs.

3. The water control valve of claim 1, wherein a groove is formed on a lower end of the rotating seat to accommodate the sliding block and the blocking plate, so that the sliding block and the blocking plate are adapted to be driven by the valve stem to move laterally within the groove.

4. The water control valve of claim 1, wherein the first hole and the second hole of the movable valve piece respectively have a first expansion portion and a second expansion portion outwardly extended from one side of hole edges of the first hole and the second hole, and the first expansion portion and the second expansion portion are recessed upward from the bottom portions of the movable valve piece so as to increase the coverage areas of the first hole and the second holes.

5. The water control valve of claim 1, wherein the bottom surface of the fixed valve piece is recessed with a flow passage, and the two hot water holes are communicated through the flow passage.

6. The water control valve of claim 1, wherein the first base is formed by assembling an upper base and a lower base together, and the cold water inlet, the hot water inlet, the first outlet, and the second outlet are positioned correspondingly between the upper base and the lower base; and after fitted together, the upper base and the lower base are connected together through ultrasonic welding.

7. The water control valve of claim 1, wherein the water control valve is connected to two check valves through an adapter seat, and the water control valve with the adapter seat and the check valve is installed into the valve chamber of the diverter valve seat; the adapter seat comprises a cold water port, a hot water port, a first outlet port, and a second outlet port, so that the first base and the diverter valve seat are interconnected and communicated through the cold water port, the hot water port, the first outlet port, and the second outlet port; and each of the cold water port and the hot water port has one check valve installed therein to prevent water backflow.

8. The water control valve of claim 7, wherein the adapter seat is formed by assembling an upper seat and a lower seat together, and the cold water port, the hot water port, the first outlet port, and the second outlet port are positioned correspondingly between the upper seat and the lower seat, and after fitted together, the upper seat and the lower seat are connected together through ultrasonic welding.

9. The water control valve of claim 1, wherein the diverter valve seat is embedded in the wall, and the first outlet passage is connected to one water-using device, while the second outlet passage is connected to the other water-using device.

10. The water control valve of claim 9, wherein one water-using device is water outlet faucet while the other water-using device is a wall-mounted showerhead.

* * * * *